(12) United States Patent
Wu et al.

(10) Patent No.: US 10,812,570 B1
(45) Date of Patent: Oct. 20, 2020

(54) SYSTEM FOR DATA CONSOLIDATION ACROSS DISPARATE NAMESPACES

(71) Applicant: INTUIT INC., Mountain View, CA (US)

(72) Inventors: Jason C. Wu, Mountain View, CA (US); Deborah J. Yu, Mountain View, CA (US); Arup Ray, Pleasanton, CA (US)

(73) Assignee: INTUIT INC., Mountain View, CA (US)

( * ) Notice: Subject to any disclaimer, the term of this patent is extended or adjusted under 35 U.S.C. 154(b) by 189 days.

(21) Appl. No.: 15/667,438

(22) Filed: Aug. 2, 2017

(51) Int. Cl.
| | |
|---|---|
| *H04L 29/08* | (2006.01) |
| *G06F 21/62* | (2013.01) |
| *G06F 16/27* | (2019.01) |
| *G06F 16/9535* | (2019.01) |
| *G06F 16/955* | (2019.01) |

(Continued)

(52) U.S. Cl.
CPC .............. *H04L 67/10* (2013.01); *G06F 16/27* (2019.01); *G06F 16/955* (2019.01); *G06F 16/9535* (2019.01); *G06F 21/62* (2013.01); *H04L 9/30* (2013.01); *H04L 9/3226* (2013.01); *H04L 67/18* (2013.01); *H04L 67/303* (2013.01); *H04L 67/30* (2013.01)

(58) Field of Classification Search
CPC ...... H04W 4/023; H04L 67/303; H04L 67/18; H04L 9/30; H04L 9/3226; H04L 67/10; H04L 67/30; G06F 16/27; G06F 16/955; G06F 16/9535; G06F 21/62
USPC .................................................. 709/217, 245
See application file for complete search history.

(56) References Cited

U.S. PATENT DOCUMENTS

| | | | | |
|---|---|---|---|---|
| 7,613,703 | B2* | 11/2009 | Kakivaya | .......... H04L 29/12132 |
| 8,065,675 | B2* | 11/2011 | Strauss | ..................... G06F 8/61 |
| | | | | 709/201 |

(Continued)

FOREIGN PATENT DOCUMENTS

| | | |
|---|---|---|
| EP | 1647929 A1 | 4/2006 |
| WO | 2016099578 A1 | 6/2016 |

OTHER PUBLICATIONS

PCT/US2017/047750 International Search Report dated Oct. 19, 2017, 15 pages.

*Primary Examiner* — James R Sheleheda
*Assistant Examiner* — Franklin S Andramuno
(74) *Attorney, Agent, or Firm* — Patterson + Sheridan, LLP

(57) ABSTRACT

Embodiments presented herein provide systems and methods for unifying data that is stored in disparate namespaces. A system described herein receives an electronic request for data associated with an entity. The electronic request includes a first identifier of the entity in a first namespace. The system includes a digital relation that maps the first identifier to a primary identifier. The system determines additional identifiers that map to the primary identifier in the relation. The additional identifiers are associated with the entity in respective additional namespaces. The system retrieves a consolidated set of profile data associated with the primary identifier, including attributes of the entity within the first namespace and attributes of the entity within the additional namespaces. The system generates an electronic response to the electronic request based on the consolidated set of profile data and sends the response to an application that submitted the electronic request.

20 Claims, 5 Drawing Sheets

(51) Int. Cl.
*H04L 9/30* (2006.01)
*H04L 9/32* (2006.01)

(56) References Cited

U.S. PATENT DOCUMENTS

| | | | | |
|---|---|---|---|---|
| 8,140,461 | B2* | 3/2012 | Cowham | G06N 5/025 706/48 |
| 2004/0205470 | A1* | 10/2004 | Jones | G06F 17/218 715/239 |
| 2005/0177560 | A1* | 8/2005 | Morioka | G06Q 10/00 |
| 2005/0246205 | A1 | 11/2005 | Wang et al. | |
| 2006/0271660 | A1* | 11/2006 | LaJeunesse | G06Q 10/10 709/223 |
| 2007/0043720 | A1* | 2/2007 | Koenig | G06Q 30/02 |
| 2011/0047381 | A1* | 2/2011 | Ganesan | G06F 21/6218 713/169 |
| 2014/0330845 | A1 | 11/2014 | Feldschuh | |
| 2015/0242454 | A1 | 8/2015 | Bakre et al. | |
| 2016/0043906 | A1* | 2/2016 | Mithani | G06F 3/04842 715/736 |
| 2016/0373327 | A1* | 12/2016 | Degioanni | G06F 11/3093 |
| 2017/0140019 | A1* | 5/2017 | Ryngler | G06F 16/275 |
| 2018/0260158 | A1* | 9/2018 | Marripudi | G06F 3/0653 |

\* cited by examiner

SYSTEM FOR DATA CONSOLIDATION ACROSS DISPARATE NAMESPACES

BACKGROUND

Field

Embodiments presented herein generally relate to systems for unifying data that is stored in disparate namespaces. More specifically, systems are disclosed for leveraging data associated with an entity in disparate namespaces to improve predictive and analytical tasks related to the entity.

Related Art

In computer science, the term "namespace" (i.e., "name scope") refers to a container or environment that holds a logical grouping of symbols that represent variables, functions, constants, types, and other elements. A namespace allows a computer to refer to elements unambiguously by their corresponding symbols. Namespaces serve a foundational purpose in computer programming, since computers generally do not deal well with ambiguity.

In some contexts, such as web development, content from more than one namespace may be merged (e.g., in a "mashup") to create a single new software service displayed in a single interface. A nomenclature problem known as "name collision" occurs when the two namespaces use the same symbol to refer to different elements. When a name collision occurs, some methodology has to be applied to resolve the resulting ambiguity for the software service to function properly.

Web development is also a context in which Application Programming Interfaces (APIs) are frequently used. APIs generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call), queries encapsulated in a Hyper-Text Transfer Protocol (HTTP) POST request, a Simple Object Access Protocol (SOAP) request, or other protocols that allow client software to invoke functions on a remote system.

SUMMARY

One embodiment of the present disclosure includes a method for unifying data stored across disparate namespaces. The method generally includes receiving, via a computer network, an electronic request for data associated with an entity, wherein the electronic request includes a first identifier associated with the entity in a first namespace; identifying a primary identifier associated with the first identifier in a digital relation, wherein the digital relation associates the primary identifier with the first identifier and a plurality of additional identifiers, and wherein each additional identifier is associated with the entity in a respective additional namespace; retrieving a set of profile data associated with the primary identifier from one or more digital data repositories, wherein the set of profile data includes attributes associated with the first identifier in the first namespace and attributes associated with the additional identifiers in the additional namespaces; generating an electronic reply for the electronic request based on the set of profile data; and sending, via the computing network, the electronic reply in response to the electronic request.

Another embodiment provides a computer-readable storage medium having instructions, which, when executed on a processor, perform an operation comprising: receiving, via a computer network, an electronic request for data associated with an entity, wherein the electronic request includes a first identifier associated with the entity in a first namespace; identifying a primary identifier associated with the first identifier in a digital relation, wherein the digital relation associates the primary identifier with the first identifier and a plurality of additional identifiers, and wherein each additional identifier is associated with the entity in a respective additional namespace; retrieving a set of profile data associated with the primary identifier from one or more digital data repositories, wherein the set of profile data includes attributes associated with the first identifier in the first namespace and attributes associated with the additional identifiers in the additional namespaces; generating an electronic reply for the electronic request based on the set of profile data; and sending, via the computing network, the electronic reply in response to the electronic request.

Still another embodiment of the present disclosure includes a processor and a memory storing a program which, when executed on the processor, performs an operation comprising: receiving, via a computer network, an electronic request for data associated with an entity, wherein the electronic request includes a first identifier associated with the entity in a first namespace; identifying a primary identifier associated with the first identifier in a digital relation, wherein the digital relation associates the primary identifier with the first identifier and a plurality of additional identifiers, and wherein each additional identifier is associated with the entity in a respective additional namespace; retrieving a set of profile data associated with the primary identifier from one or more digital data repositories, wherein the set of profile data includes attributes associated with the first identifier in the first namespace and attributes associated with the additional identifiers in the additional namespaces; generating an electronic reply for the electronic request based on the set of profile data; and sending, via the computing network, the electronic reply in response to the electronic request.

DETAILED DESCRIPTION

Embodiments presented herein provide systems and methods for unifying data stored across different namespaces and disparate data repositories without causing name collisions or violating security protocols for data sharing between applications.

In one embodiment, a profile service described herein receives an electronic request from an application for data associated with an entity. The electronic request includes a first identifier of the entity in a first namespace (e.g., which is associated with the application). The profile service includes a digital relation that maps the first identifier to a primary identifier. The system determines additional identifiers that map to the primary identifier in the relation. The additional identifiers are associated with the entity in respective additional namespaces (e.g., of other applications in communication with the profile service). The profile service collects a consolidated set of profile data associated with the primary identifier, including attributes of the entity within the first namespace and attributes of the entity within the additional namespaces. The profile service generates an electronic response to the electronic request based on the consolidated set of profile data and sends the response to the application.

The systems described herein can be helpful in many contexts where data about an entity is fractured across multiple namespaces. For example, suppose a software vendor that provides a first software application acquires a smaller software company that provides a second software application. The vendor has already has profile information for many users of the first application stored in a first data repository within a first namespace associated with the first application. In addition, the vendor acquires profile information stored in a second data repository for users of the second application within a second namespace associated with the second application. The vendor is aware that the first application and the second application have many users in common and the vendor wishes to leverage all available information about each user for analytic purposes. However, possible name collisions and other compatibility issues between the two namespaces and applications leave the vendor without an easy way to consolidate profile data for the users who have profiles with both applications. The systems described herein allow the profile data to be consolidated in a secure manner without requiring changes (e.g., code refactoring) to either application.

Figure 1:
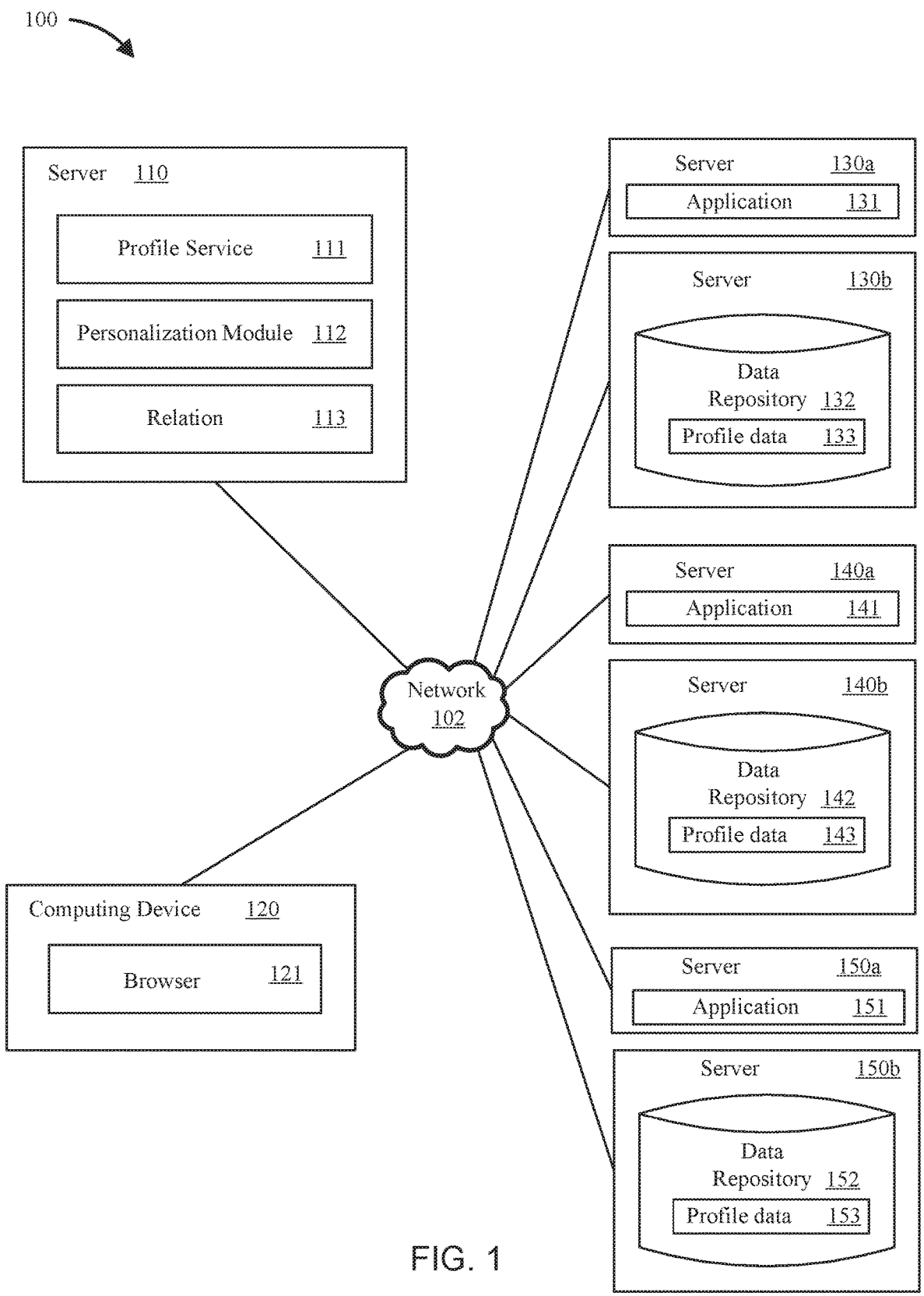
FIG. 1 illustrates a computing network environment in which data stored in disparate namespaces is consolidated and made available to multiple applications through a profile service, according to one embodiment.

FIG. 1 illustrates a computing network environment 100 in which data stored in disparate namespaces is consolidated and made available to multiple applications through a profile service 111, according to one embodiment. As shown, the environment 100 includes a network 102, a computing device 120, and servers 110, 130*a*, 130*b*, 140*a*, 140*b*, 150*a*, and 150*b*.

Computing device 120 represents a general purpose computing system hosting software applications that may be installed and run locally or may be used to access applications running on remote servers. The computing device 120 may be, for example, a smart phone, a tablet computer, a laptop computer, a desktop computer, or any other computing device or systems capable of running software applications and communicating over the network 102.

Application 131 is a first software service a user can access at the computing device 120 through the browser 121 via the network 102. Application 131 is associated with data repository 132 and a first namespace. Within the first namespace, the user is represented by a first identifier. The first identifier is associated with profile data 133. The profile data 133 can include many different attributes, such as a name, an address, or a credit card used for recurrent billing. Those attributes are defined in the first namespace. Some attributes may also describe the user's usage history (e.g., such as which functionality of the application 131 the user accesses and how frequently). Other attributes may be more domain-specific. For example, if the application 131 is an automated service for preparing a tax return, the profile data 133 may include the user's adjusted gross income, the state employer ID number of an employer that issued a W-2 form to the user, and other tax-related information.

Similarly, application 141 is a second software service the user can access at the computing device 120 through the browser 121 via the network 102. Application 141 is associated with data repository 142 and a second namespace. Within the second namespace, the user is represented by a second identifier. The second identifier is associated with profile data 143, which includes attributes defined in the second namespace. Like profile data 133, profile data 143 can include many different attributes. Again, some of those attributes may be domain-specific. For example, if the application 141 is software for personal finance management, the profile data 143 may include deposits to (and withdrawals from) the user's personal checking account, the user's projected budget for an upcoming month, and other personal financial information.

Similarly, application 151 is a third software service the user can access at the computing device 120 through the browser 121 via the network 102. Application 151 is associated with data repository 152 and a third namespace. Within the third namespace, the user is represented by a second identifier. The third identifier is associated with profile data 153. Profile data 153 includes different attributes defined in the third namespace. Again, some of those attributes may be domain-specific. For example, if the application 151 is software for payroll management, the profile data 153 may a include job title held by the user, a periodic amount withheld from paychecks for group medical insurance, and other payroll information.

Profile data 133, profile data 143, and profile data 153, while all associated with the user in some way, are isolated from each other in disparate namespaces: the first namespace, the second namespace, and the third namespace, respectively. As a result, application 131, by itself, cannot immediately leverage the additional information associated with the user in profile data 143 and profile data 153 to provide better service to the user. Similarly, application 141 and application 151 are ill-suited to leverage the full amount of information available about the user.

The profile service 111 allows application 131, application 141, and application 151 to leverage the combined information available in profile data 133, profile data 143, and profile data 153 without merging the namespaces (thereby avoiding name collisions). To facilitate combining the information, the profile service uses a relation 113. The relation 113 maps identifiers that are associated with the user in different namespaces to a single primary identifier for the user. The following example describes one manner in which the profile service 111 can operate, according to one embodiment.

Suppose the user logs on to application 131 through the browser 121. Also suppose that application 131 is an automated service for preparing a tax return. Next, suppose the user clicks a graphical interface element (e.g., a button) shown in the browser 121 to indicate the user wishes to commence preparing a tax return for the current calendar year. In response, application 131 retrieves the user's social security number, name, and address (e.g., as specified in a tax return from the previous year) from the profile data 133. In addition, the server 130*a* sends an electronic request (e.g., an API call on behalf of the application 131) to the profile service 111 via the network 102 for data associated with the user. The electronic request includes an identifier that is associated with the user in a first namespace. The first namespace, in turn, is associated with the application 131.

The profile service 111 receives the electronic request and identifies a primary identifier that is associated with the first identifier in a relation 113. In the relation 113, the primary identifier is also associated with a second identifier and a third identifier. The second identifier is associated with the user in a second namespace, while the third identifier is associated with the user in a third namespace. The second namespace is associated with the application 141, while the third namespace is associated with the application 151. The profile service 111 identifies the second identifier and the third identifier based on their association with the primary identifier in the relation 113.

In this example, the relation 113 comprises a many-one mapping (i.e., a many-one function or a many-to-one function) that maps each of the first identifier, the second identifier, and the third identifier to the primary identifier, respectively. In formal terms, a many-one mapping is defined as a function in which at least two elements of the domain map to the same element of the range (i.e., have the same image in the range).

In the many-one mapping that makes up the relation 113, the first identifier, the second identifier, and the third identifier are elements of the domain of the many-one mapping and the primary identifier is an element of the range (i.e., co-domain) of the many-one mapping. In formal terms, the primary identifier is the image of the first identifier, the image of the second identifier, and the image of the third identifier under the many-one mapping. The first identifier, the second identifier, and the third identifier, respectively, are pre-images of the primary identifier under the many-one mapping. The many-one mapping may be an "into" mapping (i.e., there may be elements of the range to which no elements of the domain map) or a surjection (i.e., an "onto" mapping such that there is at least one element of the domain that maps to each element of the range).

The relation 113 can be digitally represented in a number of ways. In one embodiment, the relation 113 is digitally represented as a table K in a database. In the table K, the range elements of the many-one mapping (e.g., such as the primary identifier) serve as entries in a primary key column. Elements of the domain of the many-one mapping serve as entries in additional columns of the table K. The additional columns correspond to different namespaces or applications. For example, one row (e.g., record) in table K will have the primary identifier as the entry in the primary key column, the first identifier as the entry in a column corresponding to the first namespace (or application 131), the second identifier as the entry in a column corresponding to the second namespace (or application 141), and the third identifier as the entry in a column corresponding to the third namespace (or application 151). In this embodiment, the profile service 111 can retrieve the row via a query that includes the first identifier (which was received in the electronic request). For example, if the first identifier is "BobJones123" and the column corresponding to the first namespace is labeled as C1, the query may be depicted as "SELECT * FROM K WHERE C1=BobJones123" in Structured Query Language (SQL). Once the row has been received in response to the query, the profile service 111 can readily identify the primary identifier, the second identifier, and the third identifier in the row.

In another embodiment, the relation 113 may be digitally represented by an associative array. An associative array includes a set of key-value pairs. In an associative array, the value of a given key-value pair can be retrieved by providing the key in a manner that conforms to the syntax of the programming language used to implement the associative array.

For the profile service 111 to successfully look up the primary identifier based on the first identifier and then look up the second and third identifiers based on the primary identifier, the associative array should be implemented in a manner that supports bidirectional lookup between domain elements and range elements for the many-one mapping. However, implementations of associative arrays in standard programming libraries generally do not support bidirectional lookup for many-one mappings. Such implementations typically only allow lookup in one direction (e.g., lookup of value based on key in a key-value pair). Those implementations that do allow bidirectional lookup (e.g., a BidiMap interface in Apache) only support scenarios where there is a one-to-one mapping between keys and values—and a many-one mapping is, by definition, not one-to-one.

Thus, in order to support bidirectional lookup in embodiments where an associative array is used to represent the relation 113, there are a number of approaches that can be used. In one example, the associative array (e.g., implemented via a hash table or a hash map) includes a first key-value pair in which the first identifier (an element of the domain of the many-one mapping) and an indication of the first namespace are combined in a predefined way (e.g., concatenation) to form the key of the key-value pair. The associative array also includes a second key-value pair in which the second identifier and an indication of the second namespace are combined in the predefined way to form the key of the second key-value pair. The associative array also includes a third key-value pair in which the third identifier and an indication of the third namespace are combined in the predefined way to form the key of the third key-value pair. The keys of any other key-value pairs in the associative array are similarly defined. The namespace indications are combined with the identifiers to form the keys of the key-value pairs to avoid collisions. (For example, if the identifier "BA1984" refers to a user named Bob Anderson in the first namespace and refers to a user named Bryan Alcott in the second namespace, the identifier "BA1984" would be unsuitable as a key in the associative array because the same key would not be able to map to two different primary identifiers for the two different users.)

In one example, the primary identifier can be used as the value for the first key-value pair, the second key-value pair, and the third key-value pair. In this example, the profile service 111 generates the key of the first key-value pair by combining the first identifier (which was received in the electronic request) with an indication of the first namespace (which may be received in, or otherwise indicated by, the electronic request). Next, the profile service 111 service looks up the value for the first key-value pair, thereby determining the primary identifier. In order to find the additional identifiers (e.g., the second identifier and the third identifier) associated with the primary identifier in the relation 113, the profile service 111 can apply a brute-force approach by iterating through every key-value pair in the associative array, selecting all key-value pairs that include the primary identifier as the value, and compiling a set of the keys from the selected key-value pairs. The keys in the set can be readily converted into the additional identifiers by reversing or inverting the methodology that was used to generate the keys from the identifiers. For example, if the indication of the second namespace was concatenated to the second identifier to form the key for the second key-value pair, the second identifier can be derived from the key by deleting the indication of the second namespace from the key. However, since the brute-force approach involves iterating through all key-value pairs, the brute-force approach is relatively inefficient.

In another example, a node can be defined for each range element (e.g., such as the primary identifier) of the many-one mapping. In this context, the term "node" refers to a computer programming construct (e.g., an object in an object-oriented programming language, a struct in C, or a record in TurboPascal) that can include multiple member data elements. Each node may comprise a member data element for storing the corresponding range element (e.g., the primary identifier) and another member element that is a list (e.g., an array, a vector, a linked list, etc.) of pointers (or references or some other indication of memory addresses) to the keys that the relation 113 maps to the range element. In this example, a node representing the primary identifier would have a list of pointers to the key of the first key-value pair, the key of the second key-value pair, and the key of the third key-value pair.

In this example, the values in the key-value pairs stored in the associative array are pointers (or references or some other indication of memory addresses) to the nodes that correspond to the range elements. For example, the value of the first key-value pair is a pointer to the node corresponding to the primary identifier. Since the many-one mapping also maps the second identifier and the third identifier to the primary identifier, the value of the second key-value pair and the value of the third key-value pair are also pointers to the node corresponding to the primary identifier. In this example, the profile service 111 generates the key of the first key-value pair by combining the first identifier (which was received in the electronic request) with an indication of the first namespace (which may be received in, or otherwise indicated by, the electronic request). Next, the profile service 111 service looks up the value for the first key-value pair, thereby identifying the node corresponding to the primary identifier. Next, the profile service 111 converts the keys in the member list contained in the node into the identifiers that map to the primary identifier in the many-one mapping (e.g., the second identifier and the third identifier) by reversing or inverting the methodology that was used to generate the keys from the identifiers. In this manner, the profile service 111 determines which identifiers map to the primary identifier without having to iterate through all key-value pairs in the associative array.

The relation 113 may also be digitally represented in some other way in other embodiments. However, regardless of the how the relation 113 is implemented, the profile service 111 ultimately uses the first identifier received in the electronic request to determine the primary identifier for the user and to determine that the second identifier and the third identifier are also associated with the user.

Next, the profile service 111 uses the primary identifier and/or additional identifiers (e.g., the first identifier, the second identifier, and the third identifier) to retrieve an aggregate set of profile data associated with the user from one or more digital data repositories. For example, the profile service 111 may send the second identifier to the application 141 in an electronic request for the profile data 143 via the network 102. The profile data 143 includes attributes associated with the second identifier (and therefore with the user and with the primary identifier of the user) in the second namespace. In response, the application 141 sends the profile data 143 to the profile service 111. The profile service 111 adds the attributes to the aggregate set of profile data.

Similarly, the profile service 111 may send the third identifier to the application 151 in an electronic request for the profile data 153 via the network 102. The profile data 153 includes attributes associated with the third identifier (and therefore with the user and with the primary identifier of the user) in the third namespace. In response, the application 151 sends the profile data 153 to the profile service 111. The profile service 111 adds the attributes to the aggregate set of profile data.

If the profile service 111 has not already received the profile data 133 from application 131 (i.e., the application that is currently requesting data from the profile service 111), the profile service 111 may also request the profile data 133 from application 131 in a similar manner and add attributes associated with the first identifier to the aggregate set of profile data. Alternatively, since application 131 already has direct access to the profile data 133, the profile service 111 may forego requesting the profile data 133.

In one embodiment, the profile service 111 adds the aggregate set of profile data in a unified entity profile for the user. The unified entity profile may allow the profile service 111 to avoid regenerating the aggregate set of profile data and avoid re-requesting the profile data 143 and the profile data 153 when responding to future electronic requests.

Next, the profile service 111 generates a response to the electronic request received from application 131 based on the aggregate set of profile data. In determining which attributes of the aggregate set of data to include in the response, the profile service 111 can take several factors into account. For example, the electronic request received from the application 131 may include filtering criteria. The filtering criteria may specify that certain types of data (e.g., sensitive data or data that the application 131 is not configured to use for any particular purpose) should be excluded from the response. In addition, there may be predefined rules defined in a security policy that profile service 111 is configured to respect. The predefined rules may prohibit the profile service 111 from including certain types of data in the response. Also, there may be user preferences (e.g., stored in a unified entity profile for the user that is stored by the profile service 111) that specify which types of data the user wishes to share between applications. The profile service 111 applies the filtering criteria, the security policy, and the user preferences to determine which attributes to include in the response. The profile service 111 sends the response to the application 131 via the network 102.

Application 131 receives the response and parses the attributes included therein. In this example, since application 131 is an automated service for preparing a tax return, application 131 uses the attributes received in the response to fill in fields of a tax form (e.g., a 1040 form). For example, suppose the response includes attributes from the second namespace (associated with application 141, which is software for personal finance management) that indicate how much the user spent on child care services and home mortgage payments during the year for which a tax return is to be prepared. Based on these attributes, the application 131 can determine that the user spent more than a threshold amount on childcare services such that the user is obliged to pay a "nanny" tax. Also, the application 131 can determine that the user qualifies for a mortgage tax deduction based on the amount spent on home mortgage payments. Thus, the application 131 determines that the nanny tax and the mortgage tax deduction apply without having to request specific input from the user about either matter, thereby streamlining the process of preparing the user's tax return.

In another example, suppose the response includes attributes from the third namespace (associated with application 151, which is software for payroll management) that indicate a medical insurance plan for which premiums were deducted from the user's paychecks during the year for which the tax return is being prepared. The attributes from the third namespace also indicate cumulative amounts deducted from the user's paychecks for federal income tax, state income tax, Medicare tax, and social security tax. Based on these attributes, the application 131 determines that the user is exempt from a tax penalty for persons without medical insurance. Also, the application 131 fills out fields in the tax form for federal income tax, state income tax, Medicare tax, and social security tax without having to solicit this information from the user.

In one embodiment, the electronic request received from the application 131 may request that the profile service 111 include a score for the user in the response. The profile service 111 can determine the score based on the aggregate profile data. In one example, the score is an income-verification metric. In this example, suppose the electronic request calls for a Boolean score that indicates whether the user's annual income is at least $60,000. An attribute in the profile data 143 specifies a cumulative amount of money (e.g., in U.S. dollars) that has been deposited into bank accounts (e.g., checking accounts and savings accounts) associated with the user over the past year. In addition, an attribute in the profile data 153 specifies an amount of the user's annual salary (e.g., in U.S. dollars). The profile service 111 can divide the cumulative amount deposited by the annual salary and multiple the resulting quotient by 100 to determine a percentage of the user's salary that is deposited into the user's bank accounts. If that percentage meets a predefined threshold percentage (e.g., 80%), the profile service 111 may determine that the applicable score for the user is 1, thereby indicating that an annual income of at least $60,000 (or some other predetermined amount) has been verified. Otherwise, the profile service 111 may determine that the score is 0. The profile service 111 includes the score in the response.

In one embodiment, the electronic request received from the application 131 may request that the profile service 111 include a personalized recommendation for the user in the response. Based on the aggregate profile data, the personalization module 112 determines a recommendation in accordance with the electronic request. For example, suppose one of the attributes in the aggregate profile data (e.g., from the second namespace) indicates that the user has a recurring payment for a mobile phone service. Also, suppose another one of the attributes in the aggregate profile data (e.g., from the second namespace) indicates the user makes frequent purchases at a local restaurant. Based on these attributes, the personalization service 112 can recommend an application that allows orders to be placed at the restaurant from a mobile phone. The profile service 111 can include an indication of the recommendation in the response. The application 131, upon receiving the response, can signal the browser 121 to display the recommendation to the user (e.g., in a sidebar or a pop-up balloon).

In another example, suppose one of the attributes in the aggregate profile data (e.g., from the second namespace) indicates that the user has deposited more than a threshold amount into a savings account over the year without making any withdrawals from the savings account. Based on this attribute, the personalization service 112 can recommend an application for investment management that would allow the user to open and manage accounts (e.g., mutual funds) that would bring the user better interest rates than the savings account. The profile service 111 can include an indication of the recommendation in the response. The application 131, upon receiving the response, can signal the browser 121 to display the recommendation to the user (e.g., in a sidebar or a pop-up balloon).

In another example, the personalization service 112 may determine (e.g., based on an attribute from the second namespace) that the user has paid more than a threshold percentage of the user's income on student loans in the past year. The personalization service 112 can recommend an alternative student-loan payment plan for which the user is likely to qualify based on this attribute. The profile service 111 can include an indication of the recommendation in the response. The application 131, upon receiving the response, can signal the browser 121 to display the recommendation to the user (e.g., in a sidebar or a pop-up balloon).

In order to determine recommendations based on attributes found in the aggregate profile data, the personalization module 112 may include a predictive model (e.g., a machine-learning model) that receives attributes as input and returns a recommendation label that is determined based on a trainable function of the attributes. There are many different types of inductive and transductive machine-learning models that can be used for the predictive model. Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

While FIG. 1 refers to the browser 121 as the application through which the user accesses applications 131, 141, and 151, one or more dedicated applications that are installed and run locally on the computing device 120 can also be used. Such a dedicated application may represent a component of a client server application (or other distributed application) that can communicate with a corresponding server over network 102. For example, a dedicated application may be a "thin" client that directs processing that is mainly performed by a corresponding server.

While servers 110, 130a, 130b, 140a, 140b, 150a, and 150b are shown as single units for simplicity in illustration, the functions and features of any server shown may be spread across multiple servers (e.g., in a cloud-computing infrastructure). The network 102, in general, may be a wide area network (WAN), a local area network (LAN), a wireless LAN (WLAN), personal area network (PAN), a cellular network, the Internet, or any other technology that allows devices to communicate electronically with other devices.

Figure 2:
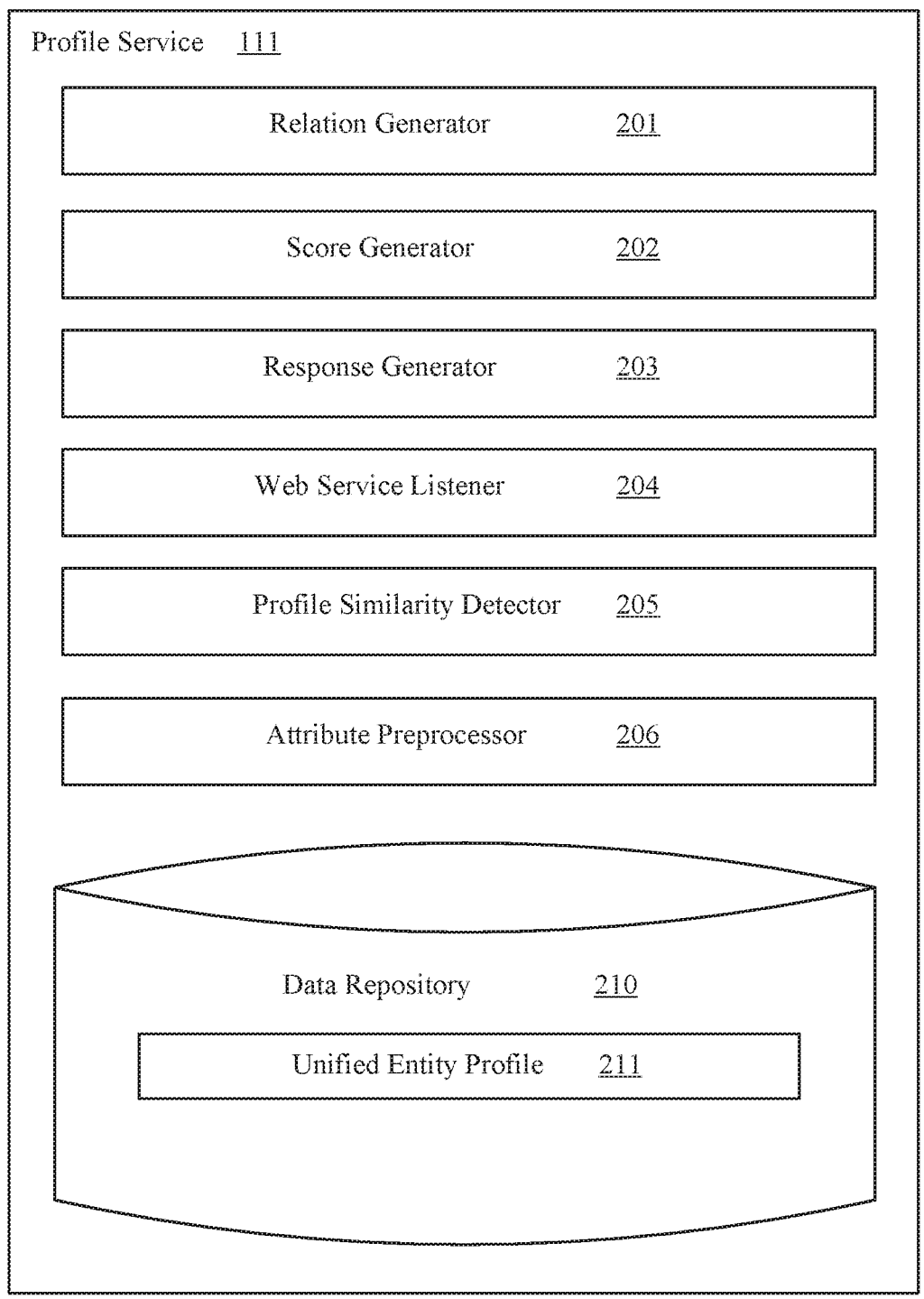
FIG. 2 illustrates a detailed view of a profile service, according to one embodiment.

FIG. 2 illustrates a detailed view of the profile service 111, according to one embodiment. As shown, the profile service 111 may include a relation generator 201, a score generator 202, a response generator 203, a web service listener 204, a profile similarity detector 205, an attribute preprocessor 206, and a data repository 210.

The relation generator 201 creates the digital representation (e.g., database table or associative array) of the relation 113. In one example, the relation generator 201 provides an interface (e.g., graphical or command-line) through which the user or a system administrator can manually specify the composition of the many-one mapping of the relation 113. For example, the interface of the relation generator 201 can provide editable graphical fields in which the user can enter the values of the first identifier, the second identifier, and the third identifier. The primary identifier, however, is generated by the relation generator 201. To ensure that the primary identifier is uniquely associated with the user (i.e., that two users are not assigned the same identifier), the relation generator 201 does not allow the user to edit the primary identifier.

Furthermore, in some embodiments, the relation generator 201 may be configured to identify the composition of the many-one mapping of the relation 113 without user input via the profile similarity detector 205. For example, suppose the user is logged in to the application 131 and has authorized the profile service 111 to access the profile data 133 (e.g., via the Open Authorization (OAuth) protocol or a similar protocol). Also suppose the user is also logged in to application 141 and has authorized the profile service 111 to access the profile data 143. Also suppose that the user is logged in the application 151 and authorized the profile service 111 to access the profile data 143, but that the user has not yet used the interface of the relation generator 201 to explicitly indicate that the first identifier, the second identifier, and the third identifier are all associated with the same user. The profile similarity detector 205 can compare attributes from profile data 133, profile data 143, and profile data 153 to determine whether profile data 133, profile data 143, and profile data 153 are associated with the same person.

For example, if each of profile data 133, profile data 143, and profile data 153 includes an attribute, respectively, for the user's social security number, the profile similarity detector 205 determines that the social security numbers match and updates the relation 113 to reflect that the first identifier, the second identifier, and the third identifier are associated with the same user. In another example, suppose each of profile data 133, profile data 143, and profile data 153 includes attributes for the user's name and phone number. If the profile similarity detector 205 determines that the names and phone numbers match, the profile similarity detector 205 updates the relation 113 to reflect that the first identifier, the second identifier, and the third identifier are associated with the same user. In another example, suppose each of profile data 133, profile data 143, and profile data 153 includes attributes for the user's name and home address. If the profile similarity detector 205 determines the names match one another, the profile similarity detector 205 proceeds to determine edit-distance alignments between the addresses. If the edit distances between the addresses are all within a predefined threshold, the profile similarity detector 205 updates the relation 113 to reflect that the first identifier, the second identifier, and the third identifier are associated with the same user. When the user later accesses the interface of the relation generator 201, the interface can present the update to the user for verification.

The web service listener 204 may be, for example, a Representation State Transfer (REST) listener configured to receive electronic requests (e.g., API calls) from applications seeking user profile information from multiple namespaces. For example, the web service listener 204 receives the electronic request sent from the server 130a on behalf of the application 131. The web service listener 204 communicates the details of the electronic request to the response generator 203.

The unified entity profile 211 includes the aggregate set of profile data (e.g., attributes) that the profile service 111 collects from profile data 133, profile data 143, and profile data 153. In addition, the unified entity profile 211 may include user preferences that specify what types of information are to be shared between applications associated with different namespaces.

The attribute preprocessor 206 may write the unified entity profile 211 to the data repository 210 in a platform-independent data-interchange format, such as JavaScript Object Notation (JSON). Furthermore, the attribute preprocessor 206 may rename attributes from different namespaces for storage in the unified entity profile 211 to ensure that there are no collisions between attribute names. For example, if there is an attribute called "Z" in the profile data 143 (used in the second namespace) that refers to the user's zip code and an attribute that is also called "Z" in the profile data 153 (used in the third namespace) that refers to the user's Zodiac sign, the attribute preprocessor 206 may append an indication of the applicable namespace to the name of each attribute for disambiguation purposes. Furthermore, the attribute preprocessor 206 may derive additional attributes for the user based on other attributes. For example, if the profile data 142 includes an attribute specifying the user's body weight and the profile data 152 includes an attribute specifying the user's height, the attribute preprocessor 206 may determine the user's body mass index (BMI) based on the weight and height.

The response generator 203 generates the response for the electronic request received from application 131. For example, if the electronic request calls for attributes to be sent in the response, the response generator 203 identifies the attributes found in the unified entity profile 211 to include in the response. The response generator 203 redacts any attributes that the user preferences or a security policy prohibit the response generator 203 from including in the response. For example, the response generator may exclude sensitive data that is unlikely to be useful for analytic purposes (e.g., such as the user's social security number).

In addition, the response generator 203 can reveal partial information for other attributes based on the user preferences or security policy. For example, if the user's preferences indicate that the user does not wish for application 131 to have access to the user's phone number, the response generator 203 can include the area code of the user's phone number in the response without divulging the other digits of the user's phone number. In another example, if a security policy prohibits the response from including the complete number of the user's credit card, the response generator 203 may include an attribute that indicates what type of credit card the user has (e.g., Visa, Mastercard, Discover, or American Express).

If the electronic request calls for a recommendation to be included in the response, response generator 203 provides at least some attributes from the unified entity profile 211 to the personalization module 112 for analysis. The personalization module returns a recommendation for the user. The response generator 203 includes an indication of the recommendation in the response.

If the electronic request calls for a score to be included in the response, the response generator 203 signals the score generator 202 to generate the requested score for the user. The score generator 202 generates the score based on a predefined scoring function. Depending on the type of score requested, the scoring function may have many different forms. In one example, a scoring function S is a function of a first numeric attribute x associated with the user (e.g., in the second namespace), a second numeric attribute y associated with the user (e.g., in the third namespace), a first numeric threshold t, and a second numeric threshold v. In this example, the scoring function S is defined piecewise as:

$$S(x, y, t, v) =$$

$$\begin{cases} 0, & (x \le 0) \cup (y \le 0) \\ 1, & (x > 0) \cap (y > 0) \cap (y = v) \cap \left[\left(\frac{x \cdot c}{y}\right) = t\right] \\ \dfrac{\left\{\left(\frac{x \cdot c}{y}\right) - t + \left|\left(\frac{x \cdot c}{y}\right) - t\right|\right\}}{2 \cdot \left|\left(\frac{x \cdot c}{y}\right) - t\right|}, & (x > 0) \cap (y > 0) \cap (y = v) \cap \left[\left(\frac{x \cdot c}{y}\right) \ne t\right] \\ \dfrac{\{(y - v) + |y - v|\}}{2 \cdot |y - v|}, & (x > 0) \cap (y > 0) \cap (y \ne v) \cap \left[\left(\frac{x \cdot c}{y}\right) = t\right] \\ \dfrac{\left\{\left(\frac{x \cdot c}{y}\right) - t + \left|\left(\frac{x \cdot c}{y}\right) - t\right|\right\} \cdot \{(y - v) + |y - v|\}}{4 \cdot \left|\left(\frac{x \cdot c}{y}\right) - t\right| \cdot |y - v|}, & \text{otherwise} \end{cases}$$

where c is a predefined scale factor and || denotes the absolute value function. The scale factor scales the quotient of x and y relative to the first numeric threshold t. For example, suppose the attribute x specifies a cumulative amount of money (e.g., in U.S. dollars) that has been deposited into bank accounts (e.g., checking accounts and savings accounts) associated with the user. In addition, suppose the attribute y specifies an amount of the user's annual salary (e.g., in U.S. dollars). Also suppose the scale factor is 100 (e.g., to convert a decimal to a percentage) and the first numeric threshold t is 80 (e.g., a threshold percentage). Furthermore, suppose the second numeric threshold v is 60,000 (e.g., with units of U.S. dollars). If the user's income is at least $60,000 and the amount deposited into the bank accounts associated with the user is at least 80% of $60,000, the scoring function will return 1. Otherwise, the scoring function will return zero. The response generator 203 includes the determined score in the response.

Figure 3:
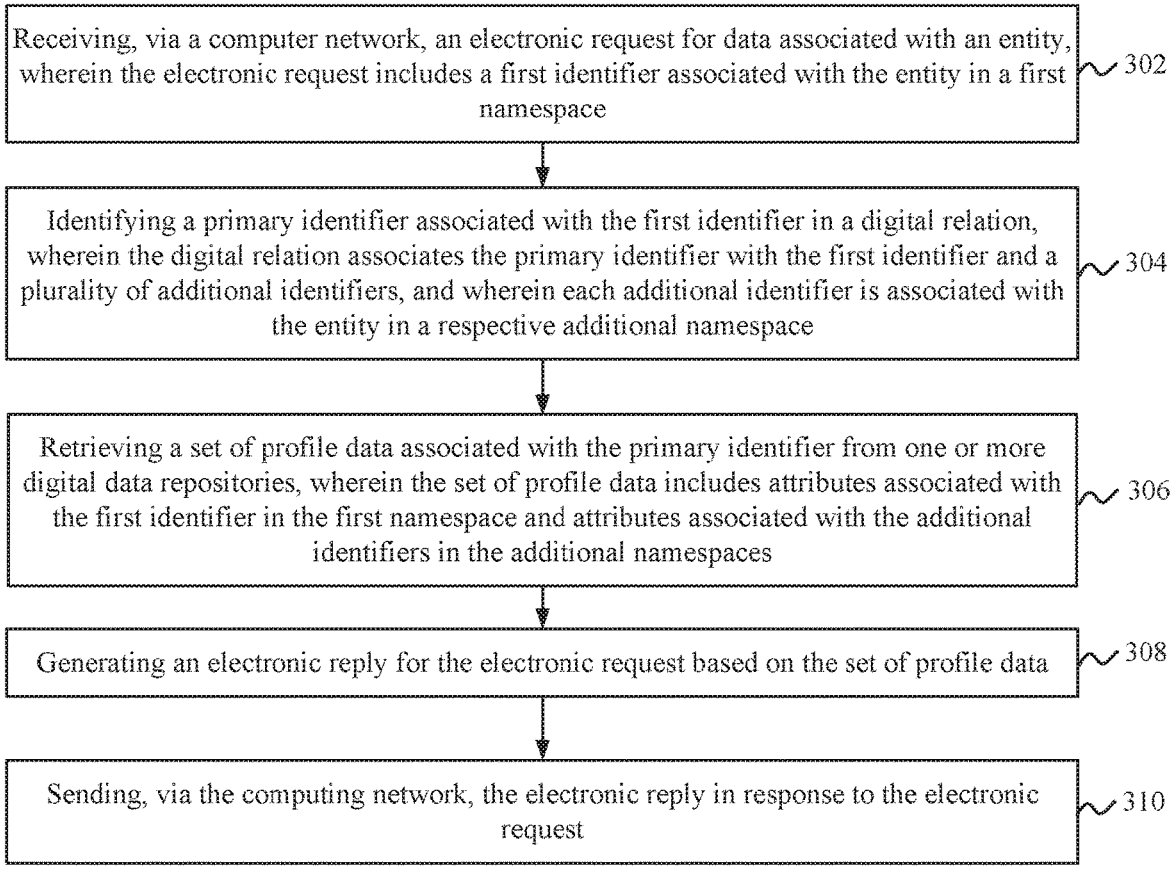
FIG. 3 illustrates example operations for a profile service, according to one embodiment.

FIG. 3 illustrates example operations 300 for a profile service, according to one embodiment. The operations 300 can be implemented as a method or the operations 300 can be executed as instructions on a machine (e.g., by one or more processors), where the instructions are included on at least one non-transitory computer-readable storage medium.

As illustrated in block 302, the operations 300 include receiving, via a computer network, an electronic request for data associated with an entity. The electronic request includes a first identifier associated with the entity in a first namespace.

In block 304, the operations 300 include identifying a primary identifier associated with the first identifier in a digital relation. The digital relation associates the primary identifier with the first identifier and a plurality of additional identifiers. Each additional identifier is associated with the entity in a respective additional namespace.

In block 306, the operations 300 include retrieving a set of profile data associated with the primary identifier from one or more digital data repositories. The set of profile data includes attributes associated with the first identifier in the first namespace and attributes associated with the additional identifiers in the additional namespaces. In one embodiment, retrieving the set of profile data comprises: retrieving the attributes associated with the first identifier in the first namespace from a first digital data repository and retrieving the attributes associated with the additional identifiers in the additional namespaces from additional data repositories that are separate from the first digital data repository.

In block 308, the operations 300 include generating an electronic reply for the electronic request based on the set of profile data. In one embodiment, generating the electronic reply comprises identifying a first application associated with the first namespace and selecting a first subset of the profile data to include in the electronic reply based on predefined rules that specify types of information the first application is authorized to receive. Generating the electronic reply may also comprise selecting a second subset of the profile data to exclude from the electronic reply based on the predefined rules. Furthermore, generating the electronic reply may also comprise identifying a filtering criterion included in the electronic request and selecting a first subset of the profile data to include in the electronic reply based on the filtering criterion.

In some embodiments, generating the electronic reply comprises generating a score for the entity based on the set of profile data and including the score in the electronic reply. Furthermore, in some embodiments, generating the electronic reply for the electronic request comprises identifying a software product to recommend to the entity based on the set of profile data and including an indication of the software product in the electronic reply.

In block 310, the operations 300 include sending, via the computing network, the electronic reply in response to the electronic request.

Figure 4:
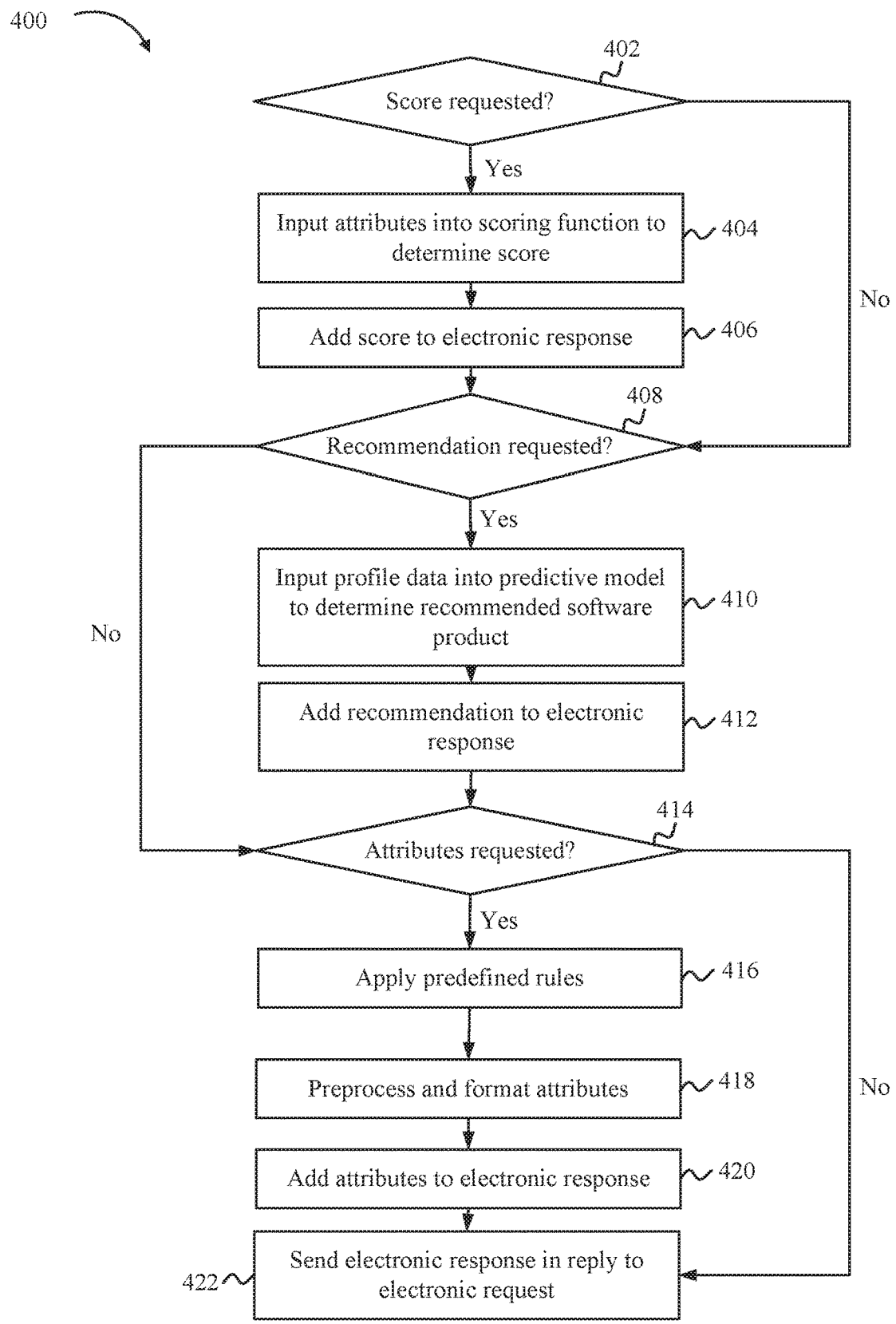
FIG. 4 illustrates example operations for a profile service to generate an electronic response to an electronic request, according to one embodiment.

FIG. 4 illustrates example operations 400 for a profile service to generate an electronic response to an electronic request, according to one embodiment. The operations 400 can be implemented as a method or the operations 400 can be executed as instructions on a machine (e.g., by one or more processors), where the instructions are included on at least one non-transitory computer-readable storage medium.

As illustrated in block 402, the operations 400 include determining whether the electronic request calls for a score to be returned in the response. If so, the flow of operations 400 proceeds to block 404. Otherwise, the flow of operations 400 proceeds to block 408.

In block 404, the operations 400 include inputting one or more attributes from a set of aggregate profile data associated with a user indicated by the electronic request into a scoring function to determine a score for the user. In block 406, the operations 400 include adding the determined score to the response.

In block 408, the operations 400 include determining whether the electronic request calls for a recommendation for the user to be included in the response. If a recommendation has been requested, the flow of operations 400 proceeds to block 410. Otherwise, the flow of operations 400 proceeds to block 414.

In block 410, the operations 400 include inputting profile data associated with the user in a plurality of namespaces into a predictive model to determine a software product to recommend to the user. In one embodiment, the predictive model is a machine-learning model. In block 412, the operations 400 include adding the recommendation to the response.

In block 414, the operations 400 include determining whether the electronic request calls for attributes associated with the user to be included in the response. If attributes have been requested, the flow of operations 400 proceeds to block 416. Otherwise, the flow of operations 400 proceeds to block 422.

In block 416, the operations 400 include applying predefined rules to determine which attributes to include in the response. The predefined rules may be defined in a security policy or a set of preferences associated with the user.

In block 418, the operations 400 include preprocessing and formatting the attributes that are to be included in the response. For example, if the electronic request called for the attributes to be formatted in a specific manner (e.g., via syntax conversions or unit conversions), the attributes are formatted accordingly. In block 420, the operations 400 include adding the attributes to the response.

In block 422, the operations 400 include sending the response in reply to the electronic request.

Figure 5:
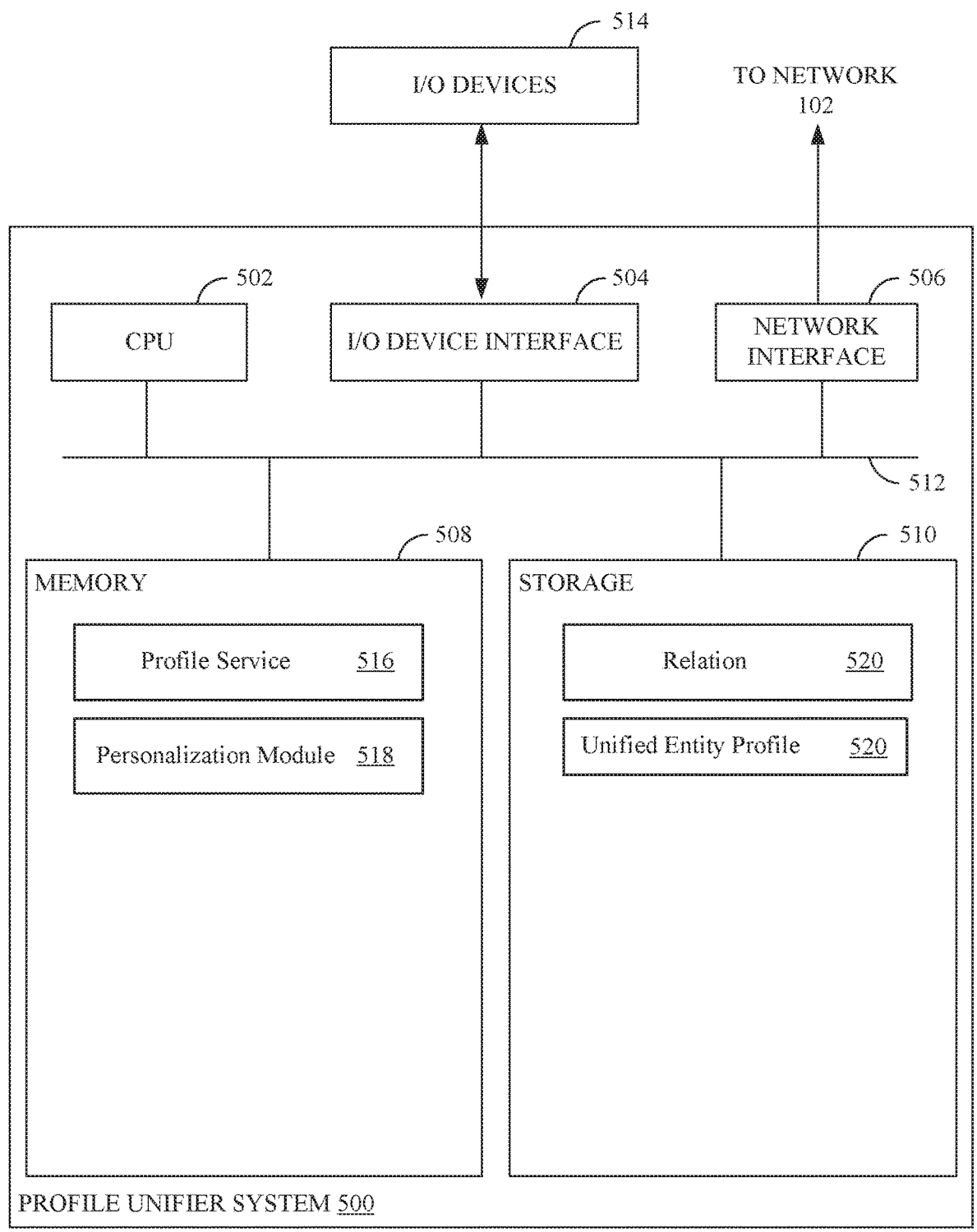
FIG. 5 illustrates a profile unifier system, according to an embodiment.

FIG. 5 illustrates a profile unifier system 500, according to an embodiment. As shown, the profile unifier system 500 includes, without limitation, a central processing unit (CPU) 502, at least one I/O device interface 504 which may allow for the connection of various I/O devices 514 (e.g., keyboards, displays, mouse devices, pen input, speakers, microphones, motion sensors, etc.) to the profile unifier system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 can represent a single CPU, multiple CPUs, a single CPU having multiple processing cores, and the like. Additionally, the memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes profile service 516 and personalization module 518. Storage 510 includes relation 520 and unified entity profile 520.

The profile service 516 can operate in the following manner. First, the profile service 516 receives an electronic request for data associated with an entity (e.g., a user). The electronic request includes a first identifier that is associated with the entity in a first namespace. The profile service 516 performs a lookup operation by determining a primary identifier to which the first identifier maps in a digital relation. The profile service 516 also identifiers a plurality of additional identifiers that are associated with the primary identifier in the relation. Each additional identifier is associated with the entity in a respective additional namespace.

Next, the profile service 516 retrieves a set of profile data associated with the primary identifier from the one or more digital data repositories. The profile service 516 may access the one or more digital data repositories via the network interface 506. The set of profile data includes attributes associated with the first identifier in the first namespace and attributes associated with the additional identifiers in the additional namespaces. The profile service stores the set of profile data in the unified entity profile 520.

The profile service 516 determines a response for the electronic request based on the set of profile data. For example, the profile service 516 may add a subset of the attributes in the set of profile data to the response. In addition, the profile service 516 may also determine a score based on the set of profile data and include the score in the response. Furthermore, the personalization module 518 may determine a recommendation for the entity based on the set of profile data. The profile service 516 may include the recommendation in the response and send the response via the network interface 506 in reply to the electronic request.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for unifying data that is stored in disparate namespaces, the method comprising:

receiving, via a computer network, an electronic request for data associated with an entity, wherein the electronic request includes a first identifier associated with the entity in a first namespace and wherein the first namespace corresponds to a first application;

identifying a primary identifier associated with the first identifier in a digital relation, wherein the digital relation associates the primary identifier with the first identifier and a plurality of additional identifiers in additional namespaces, and wherein each additional identifier is associated with the entity in a respective additional namespace, each respective additional namespace corresponding to a respective additional application;

retrieving a set of profile data associated with the primary identifier from one or more digital data repositories, wherein the set of profile data includes attributes associated with the first identifier in the first namespace and attributes associated with the additional identifiers in the additional namespaces;

generating an electronic reply for the electronic request based on the set of profile data by:
identifying the first application associated with the first namespace,
selecting a first subset of the set of profile data to include in the electronic reply based on predefined rules that types of information the first application is authorized to receive, and
selecting a second subset of the set of profile data to exclude from the electronic reply based on the predefined rules; and sending, via the computing network, the electronic reply in response to the electronic request.

2. The method of claim 1, wherein generating the electronic reply for the electronic request comprises:
identifying a filtering criterion included in the electronic request; and
selecting the first subset of the set of profile data to include in the electronic reply based on the filtering criterion.

3. The method of claim 1, wherein generating the electronic reply for the electronic request comprises:
determining a score for the entity based on the set of profile data; and
including the score in the electronic reply.

4. The method of claim 1, wherein generating the electronic reply for the electronic request comprises:
identifying a software product to recommend to the entity based on the set of profile data; and
including an indication of the software product in the electronic reply.

5. The method of claim 1, wherein retrieving the set of profile data associated with the primary identifier from the one or more digital data repositories comprises:
retrieving the attributes associated with the first identifier in the first namespace from a first digital data repository; and
retrieving the attributes associated with the additional identifiers in the additional namespaces from additional data repositories that are separate from the first digital data repository.

6. A system comprising:
one or more processors; and
memory storing one or more applications that, when executed on the one or more processors, perform an operation comprising:

receiving, via a computer network, an electronic request for data associated with an entity, wherein the electronic request includes a first identifier associated with the entity in a first namespace, and wherein the first namespace corresponds to a first application;

identifying a primary identifier associated with the first identifier in a digital relation, wherein the digital relation associates the primary identifier with the first identifier and a plurality of additional identifiers in additional namespaces, and wherein each additional identifier is associated with the entity in a respective additional namespace, each respective additional namespace corresponding to a respective additional application;

retrieving a set of profile data associated with the primary identifier from one or more digital data repositories, wherein the set of profile data includes attributes associated with the first identifier in the first namespace and attributes associated with the additional identifiers in the additional namespaces;

generating an electronic reply for the electronic request based on the set of profile data by:
identifying the first application associated with the first namespace,
selecting a first subset of the set of profile data to include in the electronic reply based on predefined rules that types of information the first application is authorized to receive, and
selecting a second subset of the set of profile data to exclude from the electronic reply based on the predefined rules; and sending, via the computing network, the electronic reply in response to the electronic request.

7. The system of claim 6, wherein generating the electronic reply for the electronic request comprises:
identifying a filtering criterion included in the electronic request; and
selecting the first subset of the set of profile data to include in the electronic reply based on the filtering criterion.

8. The system of claim 6, wherein generating the electronic reply for the electronic request comprises:
determining a score for the entity based on the set of profile data; and
including the score in the electronic reply.

9. The system of claim 6, wherein generating the electronic reply for the electronic request comprises:
identifying a software product to recommend to the entity based on the set of profile data; and
including an indication of the software product in the electronic reply.

10. The system of claim 6, wherein retrieving the set of profile data associated with the primary identifier from the one or more digital data repositories comprises:
retrieving the attributes associated with the first identifier in the first namespace from a first digital data repository; and
retrieving the attributes associated with the additional identifiers in the additional namespaces from additional data repositories that are separate from the first digital data repository.

11. A non-transitory computer-readable storage medium containing instructions that, when executed by one or more processors, perform an operation comprising:
receiving, via a computer network, an electronic request for data associated with an entity, wherein the electronic request includes a first identifier associated with the entity in a first namespace, and wherein the first namespace corresponds to a first application;

identifying a primary identifier associated with the first identifier in a digital relation, wherein the digital relation associates the primary identifier with the first identifier and a plurality of additional identifiers in additional namespaces, and wherein each additional identifier is associated with the entity in a respective additional namespace, each respective additional namespace corresponding to a respective additional application;

retrieving a set of profile data associated with the primary identifier from one or more digital data repositories, wherein the set of profile data includes attributes associated with the first identifier in the first namespace and attributes associated with the additional identifiers in the additional namespaces;

generating an electronic reply for the electronic request based on the set of profile data by:
  identifying the first application associated with the first namespace,
  selecting a first subset of the set of profile data to include in the electronic reply based on predefined rules that types of information the first application is authorized to receive, and
  selecting a second subset of the set of profile data to exclude from the electronic reply based on the predefined rules; and sending, via the computing network, the electronic reply in response to the electronic request.

12. The non-transitory computer-readable storage medium of claim 11, wherein generating the electronic reply for the electronic request comprises:
  identifying a filtering criterion included in the electronic request; and
  selecting the first subset of the set of profile data to include in the electronic reply based on the filtering criterion.

13. The non-transitory computer-readable storage medium of claim 11, wherein generating the electronic reply for the electronic request comprises:
  determining a score for the entity based on the set of profile data; and
  including the score in the electronic reply.

14. The non-transitory computer-readable storage medium of claim 11, wherein retrieving the set of profile data associated with the primary identifier from the one or more digital data repositories comprises:
  retrieving the attributes associated with the first identifier in the first namespace from a first digital data repository; and
  retrieving the attributes associated with the additional identifiers in the additional namespaces from additional data repositories that are separate from the first digital data repository.

15. The method of claim 1, wherein:
  the first identifier and the first namespace are received in a key-value pair, and
  a key of the key-value pair comprises a concatenation of the first identifier and the first namespace.

16. The method of claim 1, further comprising: triggering an application to perform one or more actions based on the first subset of the set of profile data.

17. The system of claim 6, wherein:
  the first identifier and the first namespace are received in a key-value pair, and
  a key of the key-value pair comprises a concatenation of the first identifier and the first namespace.

18. The system of claim 6, further comprising: triggering an application to perform one or more actions based on the first subset of the set of profile data.

19. The non-transitory computer-readable storage medium of claim 11, wherein:
  the first identifier and the first namespace are received in a key-value pair, and
  a key of the key-value pair comprises a concatenation of the first identifier and the first namespace.

20. The non-transitory computer-readable storage medium of claim 11, wherein the operation further comprises: triggering an application to perform one or more actions based on the first subset of the set of profile data.

* * * * *